United States Patent [19]
Heel et al.

[11] Patent Number: 5,094,797
[45] Date of Patent: Mar. 10, 1992

[54] PREPARATION OF PIGMENTED CURABLE POLYESTER MOLDING COMPOUNDS

[75] Inventors: Helmut Heel, Dannstadt-Schauernheim; Jan Holoch, Leimen; Gerd Esswein, Maxdorf; Friedrich Goffing, Frankenthal, all of Fed. Rep. of Germany

[73] Assignee: BASF Aktiengesellschaft, Ludwigshafen, Fed. Rep. of Germany

[21] Appl. No.: 588,536

[22] Filed: Sep. 26, 1990

[30] Foreign Application Priority Data

Sep. 26, 1989 [DE] Fed. Rep. of Germany ....... 3931998

[51] Int. Cl.$^5$ .............................................. B29B 11/10
[52] U.S. Cl. .................................... 264/349; 264/211; 264/211.23; 264/257; 264/331.18; 525/841; 525/49; 525/935
[58] Field of Search .............. 264/211, 211.23–211.24, 264/349, 245, 78, 331.18, 347, 245, 257; 425/205–208; 525/935, 49

[56] References Cited

U.S. PATENT DOCUMENTS

| | | |
|---|---|---|
| 3,284,232 | 11/1966 | Caldwell . |
| 3,801,693 | 4/1974 | Stallings et al. ................ 264/331.18 |
| 3,846,223 | 11/1974 | Lederman et al. ................ 264/245 |
| 3,925,301 | 12/1975 | Engel et al. ........................ 264/349 |
| 4,009,225 | 2/1977 | Maxel . |
| 4,113,822 | 9/1978 | Takiura et al. ..................... 264/349 |
| 4,141,929 | 2/1979 | Stoops et al. ................. 264/331.18 |
| 4,188,316 | 2/1980 | Sawada ............................. 264/245 |
| 4,474,473 | 10/1984 | Higuchi et al. .................... 425/208 |

FOREIGN PATENT DOCUMENTS

| | | |
|---|---|---|
| 0272127 | 6/1988 | European Pat. Off. . |
| 56-120327 | 9/1981 | Japan ............................... 264/331.18 |
| 1126017 | 9/1968 | United Kingdom ........... 264/331.18 |
| 1382244 | 1/1975 | United Kingdom ........... 264/331.18 |

Primary Examiner—Jeffery Thurlow
Attorney, Agent, or Firm—Oblon, Spivak, McClelland, Maier & Neustadt

[57] ABSTRACT

Pigmented curable polyester molding compounds which cure to give homogeneously colored moldings contain an unsaturated polyester, copolymerizable monomers, a thermoplastic polymer and a color pigment and are prepared by dispersing the pigment in the molten thermoplastic in an extruder.

3 Claims, No Drawings

PREPARATION OF PIGMENTED CURABLE POLYESTER MOLDING COMPOUNDS

FIELD OF THE INVENTION

The present invention relates to a process for preparing pigmented curable polyester molding compounds which contain an unsaturated polyester, copolymerizable monomers, a thermoplastic polymer and a color pigment.

DESCRIPTION OF THE PRIOR ART

An important use of unsaturated polyesters is in SMCs and BMCs. SMCs (sheet molding compounds) are sheets of glass fiber reinforced, filled polyester resins which are molded and cured in a press. BMCs (bulk molding compounds) are polyester resins reinforced with fillers and short fibers which are processed by injection molding. To prepare such compounds, the resin is mixed with a thermoplastic as antishrinkage component, glass fibers, fillers and an alkaline earth metal oxide or hydroxide as thickener.

Frequently, SMCs and BMCs are to be cured to form homogeneously pigmented, for example jet black, moldings. To this end, a pigment, e.g. carbon black, is added to the formulation either in pure form or as paste (e.g. U.S. Pat. No. 3,284,232 and U.S. Pat. No. 4,009,225). The black paste is composed of the pigment and an unsaturated polyester of low viscosity. If the instructions given are followed, the jet blackness is frequently unsatisfactory. At best, the moldings are mostly dark gray. Also, the homogeneity of the coloring is in many cases unsatisfactory.

EP-A-272 127, Example 26, describes a homogeneously pigmented sheet molding compound It is produced by first preparing (Example 1) a polystyrene with reactive groups by copolymerizing styrene with isopropenyloxazoline. This polystyrene is then mixed with carbon black in a kneader. In the course of the mixing, the oxazoline groups react with functional groups present on the surface of the carbon particles. The carbon graft polymer formed is then mixed with the polyester resin. This complicated procedure is employed because according to page 1 lines 15/16 it is extremely difficult under the usual conditions to mix or disperse carbon black uniformly into other substances (for example thermoplastic polymers or thermosetting resins).

OBJECT OF THE INVENTION

It is an object of the present invention to provide a simple and inexpensive process for preparing homogeneously pigmented curable molding compounds.

BRIEF SUMMARY OF THE INVENTION

We have found that this object is achieved by the present invention when the pigment is dispersed with the aid of an extruder in a molten thermoplastic polymer and the latter is mixed with the polyester resin in a conventional manner.

DETAILED DESCRIPTION OF THE INVENTION

The present invention accordingly provides a process for preparing a pigmented curable molding compound by mixing together A) 100 parts by weight of an unsaturated polyester,
B) from 30 to 150 parts by weight of a monomer which is copolymerizable with A,
C) from 1 to 100 parts by weight of a thermoplastic polymer,
D) from 0 1 to 15 parts by weight of a color pigment, and optionally further customary additives, wherein the pigment has been dispersed in at least some of the thermoplastic polymer C with the aid of an extruder at temperatures within the range of the melting point of the thermoplastic.

The following remarks concern the components:

A) Suitable unsaturated polyesters A are the customary condensation products of polybasic, in particular dibasic, carboxylic acids and their esterifiable derivatives, in particular their anhydrides, which form an ester bond with polyhydric, in particular dihydric, alcohols and may contain in addition radicals of monobasic carboxylic acids or monohydric alcohols, provided at least some of the starting materials have ethylenically unsaturated, copolymerizable groups.

Suitable alcohol components are for example ethylene glycol, 1,2-propylene glycol, 1,3-propanediol, 1,3-butanediol, 1,4-butanediol, 1,6-hexanediol, 1,2,6-hexanetriol, neopentylglycol, diethylene glycol, triethylene glycol, dipropylene glycol, 1,2-cyclohexanediol, hydrogenated bisphenol A, cyclohexanedimethanol, ethoxylated bisphenol A and also dihydroxymethyltricyclodecane, trimethylolpropane, glycerol and pentaerythritol.

Suitable carboxylic acids and derivatives thereof are dibasic olefinically unsaturated carboxylic acids, such as maleic acid, fumaric acid, chloromaleic acid, itaconic acid, citraconic acid, methyleneglutaric acid and mesaconic acid, and their esters or preferably their anhydrides. The polyesters may be modified with other dibasic, unsaturated and/or saturated, and also aromatic carboxylic acids, e.g. succinic acid, glutaric acid, adipic acid, sebacic acid, o-phthalic acid, isophthalic acid, terephthalic acid, tetrahydrophthalic acid and endomethylenetetrahydrophthalic acid.

B) Suitable copolymerizable, ethylenically unsaturated monomeric compounds are the allyl and preferably vinyl compounds which are customarily used for preparing unsaturated polyester molding compounds. Aromatic vinyl, such as styrene, substituted styrene, such as p-chlorostyrene, or vinyltoluene, esters of acrylic acid and methacrylic acid with alcohols containing from 1 to 18 carbon atoms, such as methyl methacrylate, butyl acrylate, ethylhexyl acrylate, hydroxypropyl acrylate, dihydrodicyclopentadienyl acrylate, and butanediol acrylate, and (meth)acrylamides, allyl esters, such as diallyl phthalate, and vinyl esters such as vinyl ethylhexanoate, vinyl acetate, vinyl propionate, vinyl pivalate and others. It is also possible to use mixtures of said olefinically unsaturated monomers. Preferred components B are styrene, p-methylstyrene, chlorostyrene, vinyltoluene, divinylbenzene and diallyl phthalate. Component B is present in the molding compound in amounts of from 30 to 150, preferably from 70 to 120, % by weight, based on A.

C) The thermoplastic polymer C has two functions. First, it has a shrinkage-reducing effect in the curing of the SMC or BMC and thereby improves the surface quality of the molding. Secondly, it introduces the pigment into the molding compound in such a suitable form that a homogenously colored molding is obtained on curing.

A suitable thermoplastic polymer is for example polystyrene, high impact polystyrene, polymethyl methacrylate, polyvinyl acetate, ethylene vinyl acetate copolymer or corresponding copolymers and graft copolymers. It is also possible to use saturated polyesters and thermoplastic polyurethanes. It is similarly possible to use rubberlike block copolymers, in particular those formed from 40-95% by weight of diolefin, e.g. butadiene, isoprene or chloroprene, and 60-5% by weight of aromatic vinyl, e.g. styrene or p-methylstyrene.

In contradistinction to the polymers described in EP-A-272 127, the thermoplastic polymer C does not contain any groups which react with carbon black.

Component C is present in the molding compound in amounts of from 1 to 100, preferably from 5 to 50, % by weight, based on A.

D) The color pigment used is preferably a commercial carbon black, prepared for example by the furnace black, channel black or lampblack process. However, the choice of carbon black must take into account that some types have a strong influence on the curing characteristics of the SMC or BMC.

It is also possible to use the customary pigments, e.g. organic pigments:
Heliogenblau ® (Phthalocyanine Blue)
Paliogenrot ® (Perylene Red)
Styrolgelb ® (Pyrazolone Yellow)
Neozaponrot ® (Chromium-azo complex)
Paliotolgelb ® (Isoindolinone Yellow)
Thermoplastrot ® (Anthraquinone Red) or inorganic pigments: titanium oxide, iron(III) oxide, pink red, chromium(III) oxide, cobalt blue and ultramarine.

It is advisable to use those pigments which are not destroyed or damaged under the conditions of free radical polymerization.

Component D is present in the molding compound in amounts of from 0.1 to 15% by weight, based on A. In the case of carbon black and inorganic pigments, from 2 to 10% by weight are preferred, in the case of organic pigments from 0.2 to 2% by weight.

Suitable further customary additives are reinforcing fibers, fillers, inhibitors, initiators and thickeners.

Suitable reinforcing fibers are inorganic and organic fibers in the form of rovings or in the form of sheetlike structures, possibly woven therefrom, such as mats, made for example of glass, carbon, asbestos, cellulose and synthetic organic fibers such as polyethylene, polycarboxylic esters, polycarbonates and polyamides. They are preferably present in the molding compound in amounts of from 50 to 150% by weight, based on A+B+C.

Suitable fillers are for example customary finely pulverulent or granular inorganic fillers, such as chalk, kaolin, quartz powder, dolomite, baryte, metal powders, hydrated lumina, cement, talc, diatomaceous earth, sawdust, wood chips and the like. They are preferably present in the molding compound in amounts of from 30 to 300% by weight, based on A+B+C.

Suitable inhibitors are phenolic compounds, such as hydroquinone, substituted hydroquinones, pyrocatechol, tert-butylpyrocatechol, ring-substituted pyrocatechols, quinones, such as benzoquinone, naphthoquinone, chloranil, nitrobenzenes, such as m-dinitrobenzene, thiodiphenylamine, N-nitroso compounds, such as N-nitrosodiphenylamine and salts of N-nitroso-N-cyclohexylhydroxylamine, and also mixtures thereof. Suitable additional stabilizers also include salts of divalent copper, for example cupric naphthenate or octoate, and quaternary ammonium salts. The inhibitors are preferably present in the molding compound in amounts of from 0.005 to 0.5% by weight, based on A+B+C.

The polymerization initiators used are customary organic peroxides which form free radicals under heat. Suitable initiators are for example: dibenzoyl peroxide, tert-butyl peroctoate, tert-butyl perbenzoate, dicumyl peroxide, di-tert-dibutyl peroxide and perketals, e.g. trimethylcyclohexanone perketal, and also percarbonates. It is also possible to use CC-labile compounds and azo compounds. The initiators are preferably present in the molding compound in amounts of from 0.1 to 5% by weight, based on A+B+C.

The thickeners used are oxides or hydroxides of lithium, magnesium, calcium, aluminum or titanium. Preference is given to magnesium oxide. The thickeners are preferably present in the molding compound in amounts of from 0.2 to 5% by weight, based on A+B+C.

Other possible customary additives are:
lubricants, such as zinc stearate, magnesium stearate, calcium stearate and also polyalkylene ether waxes,
paraffins for reducing monomer evaporation and for forming a non-tacky surface,
curing accelerants, for example octoates or naphthenates of copper, lead, calcium, magnesium, cerium and in particular of manganese and cobalt; also aromatic amines, such as dimethylaniline and diethylaniline,
thickening accelerants, for example ammonium chlorides, phosphonium chlorides, sulfonium halides, water, polyols and 1,2-propanediol.

To incorporate the pigments, they are dispersed in the thermoplastic polymer C at temperatures within the range of the melting point of the thermoplastic, preferably at a somewhat higher temperature. According to the present invention, this is carried out in an extruder, preferably a twin-screw extruder of high shearing efficiency. The process of dispersal generally takes not more than 5 minutes, preferably from 2 to 4 minutes. The concentration of pigment in the mixture is preferably from 5 to 50% by weight. It is advantageous to disperse the pigment only in a portion of polymer C, for example in from 10 to 50% of the total amount of C, and to mix in the remainder separately later on. It is also possible here to use two different polymers C.

The polymer/pigment premix is then mixed with the other components of the polyester resin in a conventional manner. An advantageous way of doing this is to dissolve the premix in the monomer B. Surprisingly, the pigment does not separate. The components are mixed in a conventional mixing apparatus, for example in a stirred vessel; the liquid mixture obtained is then used to impregnate glass fibers. The resulting prepregs are then thickened, if necessary, and finally molded out in a conventional manner.

DESCRIPTION OF THE PREFERRED EMBODIMENTS

In the Examples which follow, parts and percentages are by weight.

EXAMPLE 1

A. Preparation of Unsaturated Polyester Resin 98 parts of maleic anhydride, 61 parts of propylene glycol and 44 parts of dipropylene glycol are heated with stirring under nitrogen to 200° C. in the course of 2 hours. The condensation is continued until the acid number is 30. 170 parts of the unsaturated polyester thus obtained are admixed with 0.026 part of hydroquinone and then dissolved in 92 parts of styrene at 120° C.

B. Polymer Component with Carbon Black

A standard polystyrene and a carbon black (Special Black 4 from Degussa) are continuously mixed in a ratio of 3:1 in a twin-screw extruder at about 100° C. for 3 minutes and then granulated. 100 parts of the black polystyrene thus obtained are admixed with 0.03 part of p-benzoquinone and then dissolved in 203 parts of styrene.

C. Polymer Component Without Carbon Black 100 parts of high impact polystyrene (standard grade, $d_{50}$: 2-3 μm, mean viscosity of hard matrix=175 kg/mol) are admixed with 0.03 part of p-benzoquinone and then dissolved in 203 parts of styrene.

D. Preparation of Molding Compounds

A high-speed stirrer (about 1000 min$^{-1}$) is used to prepare the following mixtures:

| | I parts by weight | II (comparative) parts by weight |
|---|---|---|
| UP resin | 60 | 60 |
| High polymer component with carbon black | 10 | — |
| High polymer component without carbon black | 30 | 40 |
| Carbon black | — | 2.5 |
| Styrene | 5 | 5 |
| Calcium carbonate | 180 | 180 |
| Zinc stearate | 4.5 | 4.5 |
| tert-Butyl perbenzoate | 1.5 | 1.5 |
| MgO paste (35% strength) | 2.5 | 2.5 |

Chopped glass rovings (l=2.5 cm) are prepreged with the mixtures between polyethylene sheets (glass content of SMC: 30%). After a ripening time of 1 week the cover sheets are peeled off and the prepregs are formed in a steel tool (size about 45×50 cm) into moldings (60 bar, 145° C., 3 min).

Moldings from mixture I have a homogeneous black color, while moldings from mixture II show distinct inhomogeneities in color and lesser jet blackness.

EXAMPLE 2

A. Preparation of the Unsaturated Polyester Resin 98 parts of maleic anhydride, 61 parts of propylene glycol and 44 parts of dipropylene glycol are heated with stirring under nitrogen to 200° C. in the course of 2 hours. The condensation is continued until the acid number is 30. 170 parts of the unsaturated polyester thus obtained are admixed with 0.026 part of hydroquinone and then dissolved in 92 parts of styrene at 120° C.

B. Yellow-Pigmented Polymer Component

A standard polystyrene and Styrolgelb G from BASF are continuously mixed in a ratio of 4:1 in a twin-screw extruder at about 100° C. for 3 minutes and then granulated. 100 parts of the yellow polystyrene thus obtained are admixed with 0.03 part of p-benzoquinone and then dissolved in 203 parts of styrene.

C. Non-Pigmented Polymer Component 100 parts of high impact polystyrene (standard grade, $d_{50}$: 2-3 μm, mean viscosity of hard matrix=175 kg/mol) are admixed with 0.03 part of p-benzoquinone and then dissolved in 203 parts of styrene.

D. Preparation of Molding Compounds

A high-speed stirrer (about 1000 min$^{-1}$) is used to prepare the following mixtures:

| | I parts by weight | II (comparative) parts by weight |
|---|---|---|
| UP resin | 60 | 60 |
| Pigmented high polymer component | 12.1 | — |
| Non-pigmented high polymer component | 27.9 | 40 |
| Colorant | — | 0.8 |
| Styrene | 5 | 5 |
| Calcium carbonate | 180 | 180 |
| Zinc stearate | 4.5 | 4.5 |
| tert-Butyl perbenzoate | 1.5 | 1.5 |
| MgO paste (35% strength) | 2.5 | 2.5 |

Chopped glass rovings (l=2.5 cm) are prepreged with the mixtures between polyethylene sheets (glass content of SMC: 30%). After a ripening time of 1 week the cover sheets are peeled off and the prepregs are formed in a steel tool (size about 45×50 cm) into moldings (60 bar, 145° C., 3 min).

Moldings from mixture I have a homogeneous yellow color, while moldings from mixture II show distinct inhomogeneities in color and a lesser depth of shade.

EXAMPLE 3

A. Preparation of the Unsaturated Polyester Resin 98 parts of maleic anhydride, 61 parts of propylene glycol and 44 parts of dipropylene glycol are heated with stirring under nitrogen to 200° C. in the course of 2 hours. The condensation is continued until the acid number is 30. 170 parts of the unsaturated polyester thus obtained are admixed with 0.026 part of hydroquinone and then dissolved in 92 parts of styrene at 120° C.

B. Blue-Pigmented Polymer Component

A standard polystyrene and Heliogen Blue from BASF are continuously mixed in a ratio of 9:1 in a twin-screw extruder at about 100° C. in the course of 3 min and then granulated. 100 parts of the blue polystyrene thus obtained are admixed with 0.03 part of p-benzoquinone and then dissolved in 203 parts of styrene.

C. Non-Pigmented Polymer Component 100 parts of high impact polystyrene (standard grade, $d_{50}$: 2-3 μm, mean viscosity of hard matrix=175 kg/mol) are admixed with 0.03 part of p-benzoquinone and then dissolved in 203 parts of styrene.

D. Preparation of Molding Compounds

A high-speed stirrer (about 1000 min$^{-1}$) is used to prepare the following mixtures:

| | I parts by weight | II (comparative) parts by weight |
|---|---|---|
| UP resin | 60 | 60 |
| Pigmented high polymer component | 30.3 | — |
| Non-pigmented high polymer component | 9.7 | 40 |
| Colorant | — | 1.0 |

-continued

|  | I parts by weight | II (comparative) parts by weight |
|---|---|---|
| Styrene | 5 | 5 |
| Calcium carbonate | 180 | 180 |
| Zinc stearate | 4.5 | 4.5 |
| tert-Butyl perbenzoate | 1.5 | 1.5 |
| MgO paste (35% strength) | 2.5 | 2.5 |

Chopped glass rovings (l=2.5 cm) are prepreged with the mixtures between polyethylene sheets (glass content of SMC: 30%). After a ripening time of 1 week the cover sheets are peeled off and the prepregs are formed in a steel tool (size about 45×50 cm) into moldings (60 bar, 145° C., 3 min).

Moldings from mixture I have a homogeneous blue color, while moldings from mixture II show distinct inhomogeneities in color and a lesser depth of shade.

EXAMPLE 4

A. Preparation of the Unsaturated Polyester Resin 98 parts of maleic anhydride, 105 parts of propylene glycol are heated with stirring under nitrogen to 200° C. in the course of 2 hours. The condensation is continued until the acid number is 30. 170 parts of the unsaturated polyester thus obtained are admixed with 0.026 part of hydroquinone and then dissolved in 92 parts of styrene at 120° C.

B. Red-Pigmented Polymer Component

An acid-modified polymethyl methacrylate (acid no. 6, melting point about 100° C.) and Paliogen Red from BASF are continuously mixed in a ratio of 9:1 in a twin-screw extruder at about 120° C. in the course of 3 min and then granulated. 100 parts of the red polymethyl methacrylate thus obtained are admixed with 0.03 part of p-benzoquinone and then dissolved in 150 parts of styrene.

C. Non-Pigmented Polymer Component 100 parts of polymethyl methacrylate (acid-modified; acid no. 6, melting point about 100° C.) are admixed with 0.03 part of p-benzoquinone and then dissolved in 150 parts of styrene.

D. Preparation of Molding Compounds

A high-speed stirrer (about 1000 min⁻¹) is used to prepare the following mixtures:

|  | I parts by weight | II (comparative) parts by weight |
|---|---|---|
| UP resin | 60 | 60 |
| Red-pigmented high polymer component | 20 | — |
| Non-pigmented high polymer component | 20 | 40 |
| Colorant | — | 0.8 |
| Styrene | 5 | 5 |
| Calcium carbonate | 180 | 180 |
| Zinc stearate | 4.5 | 4.5 |
| tert-Butyl perbenzoate | 1.5 | 1.5 |
| MgO paste (35% strength) | 2.5 | 2.5 |

Chopped glass rovings (l=2.5 cm) are prepreged with the mixtures between polyethylene sheets (glass content of SMC: 30%). After a ripening time of 1 week the cover sheets are peeled off and the prepregs are formed in a steel tool (size about 45×50 cm) into moldings (60 bar, 145° C., 3 min).

Moldings from mixture I have a homogeneous red color, while moldings from mixture II show distinct inhomogeneities in color and a lesser depth of shade.

EXAMPLE 5

A. Preparation of the Unsaturated Polyester Resin 98 parts of maleic anhydride, 105 parts of propylene glycol are heated with stirring under nitrogen to 200° C. in the course of 2 hours. The condensation is continued until the acid number is 30. 170 parts of the unsaturated polyester thus obtained are admixed with 0.026 part of hydroquinone and then dissolved in 92 parts of styrene at 120° C.

B. Blue-Pigmented Polymer Component

A polyvinyl acetate (acid-modified; acid no. 7-8, melting point 90°-110° C.) and Heliogen Blue from BASF are continuously mixed in a ratio of 20:1 in a twin-screw extruder at about 130° C. in the course of 3 min and then granulated. 100 parts of the blue polyvinyl acetate thus obtained are admixed with 0.03 part of p-benzoquinone and then dissolved in 143 parts of styrene.

C. Non-Pigmented Polymer Component 100 parts of polyvinyl acetate (acid-modified; acid no. 7-8, melting point 90°-110° C.) are admixed with 0.03 part of p-benzoquinone and then dissolved in 143 parts of styrene.

D. Preparation of Molding Compounds

A high-speed stirrer (about 1000 min⁻¹) is used to prepare the following mixtures:

|  | I parts by weight | II (comparative) parts by weight |
|---|---|---|
| UP resin | 60 | 60 |
| Blue-pigmented high polymer component | 40 | — |
| Non-pigmented high polymer component | — | 40 |
| Colorant | — | 0.8 |
| Styrene | 5 | 5 |
| Calcium carbonate | 180 | 180 |
| Zinc stearate | 4.5 | 4.5 |
| tert-Butyl perbenzoate | 1.5 | 1.5 |
| MgO paste (35% strength) | 2.5 | 2.5 |

Chopped glass rovings (l=2.5 cm) are prepreged with the mixtures between polyethylene sheets (glass content of SMC: 30%). After a ripening time of 1 week the cover sheets are peeled off and the prepregs are formed in a steel tool (size about 45×50 cm) into moldings (60 bar, 145° C., 3 min).

Moldings from mixture I have a homogeneous blue color, while moldings from mixture II show distinct inhomogeneities in color and a lesser depth of shade.

We claim:

1. A process for preparing a pigmented curable molding compound of improved homogeneity comprising mixing together
   A) 100 parts by weight of an unsaturated polyester,
   B) from 30 to 150 parts by weight of a monomer which is copolymerizable with A, C) from 1 to 100 parts by weight of a thermoplastic polymer virtually free of groups which can undergo a chemical reaction with carbon black, D) from 0.1 to 15 parts by weight of a color pigment, and optionally further customary additives, forming a premix of the pigment by dispersing it in at least some of the thermoplastic polymer C with the aid of an extruder at temperatures within the range of the melting point of the thermoplastic, and dissolving said premix in said monomer B prior to mixing it with said unsaturated polyester A.

2. A process as claimed in claim 1, wherein the dispersing the pigment takes not more than 5 minutes.

3. A process as claimed in claim 1, wherein the pigment is carbon black.

* * * * *